Patented Jan. 19, 1954

2,666,787

UNITED STATES PATENT OFFICE 2,666,787

PRODUCTION OF SULFONYL-ISOCYANATES

Hans Krzikalla, Heidelberg, Germany, assignor to Badische Anilin- & Soda-Fabrik Aktiengesellschaft, Ludwigshafen (Rhine), Germany No Drawing. Application August 3, 1950, Serial No. 177,559

Claims priority, application Germany August 20, 1949

1 Claim. (Cl. 260—545)

This invention relates to a new and advantageous process for producing sulfonyl isocyanates.

Sulfonyl-isocyanates (R—SO$_2$—N=C=O) have hitherto only been prepared in a troublesome manner by the action of silver cyanate on sulfonyl chlorides, sulfonic acid anhydrides and other compounds being formed as by-products.

It is an object of the present invention to make available a new process for the production of sulfonylisocyanates. This process is very simple and applicable generally to sulfonamides having a NH$_2$ group.

According to the present invention a sulfonamide having at least one —SO$_2$NH$_2$ group is treated with phosgene at elevated temperature in an inert solvent. The two compounds react according to the following equation

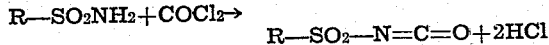

Since the essential part for this reaction is the sulfonamide group, the nature of the radicle to which this group is attached is immaterial, provided that it is free from groups which might react with phosgene themselves such as oxy or primary or secondary amino groups.

Generally speaking, I may use as starting materials the simple sulfonamides wherein the —SO$_2$NH$_2$ group is attached to a hydrocarbon radicle, such as a straight or branched chain aliphatic hydrocarbon radicle containing from 3 to 24 carbon atoms, or an aromatic mono- or polynuclear hydrocarbon radicle such as phenyl, tolyl, naphthyl and the like. Alicyclic araliphatic hydrocarbon radicles may also be present.

The radicle attached to the —SO$_2$NH$_2$ group may also contain inert substituents such as tertiary amino groups, keto groups or ether or thioether groups. I may also use heterocyclic sulfonamides wherein the heteroatoms are inert, as for example in the furane, thiophene or pyridine nucleus.

The reaction is preferably carried out by leading phosgene into the liquid, molten, dissolved or suspended sulfonamide. As inert solvents, I may use high boiling hydrocarbons, aromatic chlorhydrocarbons or nitrohydrocarbons. To ensure a quick reaction, the reaction temperature should exceed 160° C. I prefer to work at temperatures between 200° and 250° C., preferably by carrying out the reaction in an inert solvent boiling within that range. The sulfonylisocyanates of lower molecular weight may frequently be purified by simple distillation.

The sulfonyl-isocyanates which are thus conveniently accessible are, by reason of their great reactivity, valuable intermediate products, for example for the production of plastics.

It is known that isocyanates of the formula R—N=C=O which contain no sulfonyl group between the group R and the isocyanate group can be prepared by reacting phosgene upon primary amines or the hydrogen chlorides thereof at higher temperatures in the presence of an inert solvent. Acylamino compounds containing the groups —NH—CO— or —NH—CO—NH respectively when they are reacted with phosgene result in the splitting of the aforesaid groups. Therefore it was surprising that sulfonamides containing the group —SO$_2$NH$_2$ are not split by the action of phosgene but are converted smoothly into sulfonyl isocyanates containing the group —SO$_2$—N=C=O under the reaction conditions described above. It is also known that compounds containing sulfonamide groups

are converted into higher molecular condensation products when they interact with phosgene in an alkaline medium at 10° C. to 15° C. In sharp contrast thereto the present invention arises from the discovery that the reaction of phosgene with sulfonamides in an inert solvent at 160° C. to 250° C. results in the production of monomolecular sulfonyl isocyanates.

The following examples will further illustrate the invention but the invention is not limited to these examples. The parts are by weight.

Example 1

Phosgene is led into a boiling solution of 342 parts of para-toluene-sulfonamide in 1200 parts of trichlorobenzene until the whole of the sulfonamide has reacted. After distilling off the solvent under reduced pressure, the para-toluene-sulfonyl-isocyanate passes over as a water-white liquid at 114° to 116° C. at a pressure of 0.3 to 0.5 millimeters (mercury gauge). The yield is more than 80 per cent of the theoretical yield.

Ortho-toluene-sulfonyl-isocyanate is obtained by employing ortho-toluene-sulfonamide instead of para-toluene-sulfonamide.

Phenyl-sulfonyl-isocyanate or its substitution products, as for example the halogen or alkoxy derivatives, or the corresponding naphthalene, diphenyl, pyridyl, thienyl or anthraquinone derivatives may be obtained in the same or a similar manner.

Example 2

256 parts of a mixture of aliphatic sulfonamido compounds having an average chain length of from about 14 to 15 carbon atoms and a nitrogen content of about 5.4 per cent (such as is obtainable by reacting a mixture of equivalent amounts of chlorine and sulfur dioxide on an irradiated benzine fraction and passing ammonia into the sulfonyl chloride mixture thus obtained) are diluted with about 600 parts of trichlorobenzene or of a benzine fraction having a boiling point of about 210° C. Phosgene is led in while stirring as described in Example 1, whereby the corresponding sulfonyl-isocyanate mixture is obtained. Most of it passes over as a water-white liquid at about 160° to 190° C. under a pressure of 0.5 millimeter (mercury gauge). It can be used directly for further reactions and reacts violently with water, alcohols or amines.

In an analogous manner, cyclohexyl or cyclopentyl sulfonyl-isocyanates can be obtained by reacting cyclohexyl or cyclopentyl sulfonamides with phosgene.

Example 3

100 parts of beta-anthraquinone-sulfonamide are dissolved in 500 parts of trichlorobenzene or nitrobenzene at the boiling point. Phosgene is led in until practically complete dissolution has taken place. Impurities are removed by filtration. The sulfonyl-isocyanate formed may be used directly in the resulting solution for further reactions. Upon the addition of aniline, for example, there is formed by heating N'-beta-anthraquinone-sulfonyl-N-phenyl urea which is obtained in the pure state after recrystallization from glacial acetic acid.

What I claim is:

A process for the production of para-toluene sulfonyl isocyanate which comprises reacting phosgene at temperatures between 160° C. and 250° C. in the presence of an inert solvent with para-toluene sulfonamide.

HANS KRZIKALLA.

References Cited in the file of this patent

UNITED STATES PATENTS

| Number | Name | Date |
|---|---|---|
| 2,401,155 | Hentrich et al. | May 28, 1946 |

OTHER REFERENCES

Degering, "An Outline of Organic Nitrogen Compounds," pp. 543–4, University Lithoprinters, Ypsilanti, Michigan, 1945.